(12) United States Patent
Lin et al.

(10) Patent No.: US 8,161,604 B2
(45) Date of Patent: Apr. 24, 2012

(54) 360° BI-DIRECTIONAL ROTARY HINGE (75) Inventors: Tsu-Yu Lin, Taoyuan (TW); Cheng-Yo Hsiao, Taoyuan (TW); Chun-Meng Hsu, Taipei Hsien (TW); Chun-Mu Chen, Taipei Hsien (TW)

(73) Assignees: Lianhong Art Co., Ltd., Taoyuan (TW); Wistron Corporation, Taipei Hsien (TW)

( * ) Notice: Subject to any disclaimer, the term of this patent is extended or adjusted under 35 U.S.C. 154(b) by 175 days.

(21) Appl. No.: 12/815,543

(22) Filed: Jun. 15, 2010

(65) Prior Publication Data
US 2011/0252601 A1    Oct. 20, 2011

(30) Foreign Application Priority Data

Apr. 15, 2010   (TW) .............................. 99206798 U (51) Int. Cl.
*E05D 3/10*    (2006.01)
(52) U.S. Cl. .............................. 16/367; 16/337; 16/340
(58) Field of Classification Search ............ 16/337–339, 16/342, 330, 303, 374, 376, 377, 340, 367; 361/679.12, 679.06, 679.07; 455/90.3, 575.1, 455/575.3, 575.8; 379/433.12, 433.13; 348/373, 348/333.01, 333.06, 794
See application file for complete search history.

(56) References Cited

U.S. PATENT DOCUMENTS

| 7,024,729 | B2 * | 4/2006 | Chang et al. | 16/367 |
| 7,779,511 | B2 * | 8/2010 | Hung | 16/367 |
| 2004/0083577 | A1 * | 5/2004 | Lu et al. | 16/367 |
| 2006/0021195 | A1 * | 2/2006 | Yamada et al. | 16/367 |
| 2006/0218750 | A1 * | 10/2006 | Tajima | 16/367 |
| 2008/0000050 | A1 * | 1/2008 | Hsu | 16/367 |
| 2008/0034545 | A1 * | 2/2008 | Shieh | 16/367 |
| 2008/0078060 | A1 * | 4/2008 | Chen | 16/367 |
| 2008/0271293 | A1 * | 11/2008 | Hsu et al. | 16/367 |
| 2009/0121094 | A1 * | 5/2009 | Chang et al. | 248/125.7 |
| 2010/0005626 | A1 * | 1/2010 | Wang et al. | 16/367 |

FOREIGN PATENT DOCUMENTS

| TW | M328762 | 3/2008 |
| TW | I296680 | 5/2008 |
| TW | M357838 | 5/2009 |

* cited by examiner

*Primary Examiner* — Chuck Y. Mah
(74) *Attorney, Agent, or Firm* — Guice Patents PLLC (57) ABSTRACT

A 360° bi-directional rotary hinge formed of a fixed bracket, a rotary bracket, a limiter plate, a stop plate, a positioning plate, a spring ring and a fastening member for use in a folding electronic device is disclosed. Subject to matching between bottom blocks of the limiter plate and arched sliding grooves of the stop plate, movement of the stop plate is constrained by the fixed bracket, and therefore rotation of the rotary bracket of the 360° bi-directional rotary hinge is limited to a forward and backward 360° angle. Further, the stop plate carries an index block corresponding to a −180° angle indication hole and a 180° angle indication hole on the base member of the folding electronic device for giving an indication when the rotary bracket is rotated to +180° or −180° angle relative to the fixed bracket.

8 Claims, 12 Drawing Sheets

360° BI-DIRECTIONAL ROTARY HINGE

BACKGROUND OF THE INVENTION

1. Field of the Invention

The present invention relates to a hinge for use in a folding electronic device and more particularly, to a 360° bi-directional rotary hinge for use in a folding electronic device between a base member and a cover member for allowing the cover member to be opened from the base member and rotated clockwise/counter-clockwise within 360°.

2. Description of the Related Art

A folding electronic device generally comprises a base member and a cover member hinged to the base member. For example, a notebook computer comprises a base member carrying a keyboard, and a cover member carrying a display screen and hinged to the base member by a hinge.

In order for allowing rotation of the cover member in vertical, for example, for allowing the display screen to be turned to different directions after the notebook computer is opened, a bi-directional rotary hinge shall be used. A bi-directional rotary hinge may provide a positioning mechanism for holding the cover member in position after the cover member is rotated in vertical to the desired angle, and a limiter to limit the angle of rotation of the cover member. Taiwan Patent No. 1296680 discloses a dual-shaft hinge design entitled "Dual-shaft hinge for electronic device". This dual-shaft hinge enables a second member of an electronic device to be opened from or closed on a first member the electronic device. Normally, the second member can be kept in a predetermined position after having been opened from the first member. However, when necessary, the second member can be rotated leftwards or rightwards relative to the first member. The dual-shaft hinge comprises a first shaft and a second shaft. The second member of the electronic device can be turned vertically about the first shaft of the dual-shaft hinge and closed on or opened from the first member of the electronic device. When opened, the second member of the electronic device can be turned horizontally about the second shaft of the dual-shaft hinge. The dual-shaft hinge further comprises a vertical biasing control means located on the first shaft for controlling vertical biasing of the second member of the electronic device, a horizontal biasing control means located on the second shaft for controlling horizontal biasing of the second member of the electronic device, and a movable stop means set between a support member of the vertical biasing control means and a mounting member of the horizontal biasing control means. Subject to the functioning of the movable stop means, horizontal rotation of the second member of the electronic device relative to the first member of the electronic device is limited to a predetermined angle. When rotating the second member of the electronic device further, the aforesaid constraint is released for enabling the second member to be rotated further in the same direction.

Taiwan Utility Model Patent No. M328762 discloses another design of hinge, entitled "Hinge". This design of hinge comprises a screen mounting frame affixed to a screen of an electronic device, a pivot shaft located on the bottom side of the screen mounting frame, a base member mounting frame pivotally coupled to the pivot shaft and affixed to a base member of the electronic device, a limiter located on the base member mounting frame, and a pivot mechanism disposed at the base member mounting frame. The pivot mechanism comprises an inner hinge plate and an outer hinge plate mounted on an axle thereof. The outer hinge plate has a center pivot hole, a plurality of a notch radially extended from the center pivot hole and a plurality of limiter ribs spaced around the periphery thereof. The inner hinge plate is pivotally mounted in the pivot hole of the outer hinge plate, having a stop block corresponding to the notch of the outer hinge plate. By means of biasing of the stop block of the inner hinge plate in the notch of the outer hinge plate, the hinge is allowed for a 360° rotation in horizontal.

Taiwan Utility Model Patent No. M357838 discloses hinge design, entitled "Hinge and electronic device having same". According to this design, an electronic device comprises a base member, a cover member and a hinge connected between the base member and the cover member, wherein the hinge comprises a first actuator and a second actuator. The first actuator comprises a guide means adapted for stopping against the second actuator for a certain distance displacement. After rotation of the cover member in either of two reversed directions to a certain angle, the second actuator will be stopped against the guide means of the first actuator to push the guide means, thus, the cover member can be rotated through 360° in either of two reversed directions, avoiding any visual dead angle. The design of the movable guide means limits the angle of rotation of the cover member to protect the electrical wire, and avoids any visual dead angle.

The aforesaid prior art hinge designs allow a 360° rotation in either of two reversed directions and have positioning and angle-limit functions, however their angle-limit structures are complicated, complicating the installation procedure. Further, the design of movable stop means for allowing a 360° rotation complicates the fabrication and installation of the hinge, lowers the stability and tends to get stuck during operation.

Therefore, it is desirable to provide a 360° bi-directional rotary hinge that overcomes the drawbacks of the aforesaid prior art hinge designs.

SUMMARY OF THE INVENTION

The present invention has been accomplished under the circumstances in view. It is the main object of the present invention to provide a 360° bi-directional rotary hinge comprised of a fixed bracket, a rotary bracket, a limiter plate, a stop plate, a positioning plate, a spring ring and a fastening member, which facilitates installation and avoids getting stuck during angular adjustment. Subject to matching between bottom blocks of the limiter plate and arched sliding grooves of the stop plate, movement of the stop plate is constrained by the fixed bracket, and therefore rotation of the rotary bracket of the 360° bi-directional rotary hinge is limited to a forward and backward 360° angle. Further, the limiter plate and the stop plate are annular members having approximately a same size, the installation of the 360° bi-directional rotary hinge is easy. During operation, the rotary bracket can be rotated relative to the fixed bracket smoothly, avoiding getting stuck.

To achieve this and other objects of the present invention, a 360° bi-directional rotary hinge is used in a folding electronic device and connected between a base member and a cover member of the folding electronic device. The 360° bi-directional rotary hinge comprises a fixed bracket, which is fixedly mounted in the base member of the folding electronic device, comprising an axle hole cut through top and bottom walls thereof, two stop blocks raised from the top wall thereof and disposed at two opposite sides adjacent to the axle hole and two opposing positioning notches radially extended from the axle hole in reversed directions, a rotary bracket, which comprises two pivot arms horizontally aligned in a line at the top side thereof, two mounting plates respectively and rotatably coupled to the pivot arms and affixed to the cover member of the folding electronic device for enabling the cover member to be opened from and closed on the base member, a stop flange located on the middle part thereof and a vertical stub shaft downwardly extended from the stop flange and rotatably inserted through the axle hole of the fixed bracket, a limiter plate, which comprises an annular base adapted for synchronous rotation with the vertical stub shaft of the rotary bracket and two bottom blocks downwardly protruded from the bottom wall of the annular base at two opposite sides, a stop plate, which comprises an annular base sleeved onto the vertical stub shaft of the rotary bracket for allowing rotation of the rotary bracket relative to the stop plate, a locating block radially extended from the periphery of the annular base and supported on the top wall of the fixed bracket between the two stop blocks and two arched sliding grooves bilaterally located on the top wall of the annular base for receiving the two bottom blocks of the limiter plate respectively, a positioning plate, which is provided beneath the axle hole of the fixed bracket and which comprises an annular base adapted for rotation with the vertical stub shaft of the rotary bracket and two opposing locating blocks protruded from the top wall of the annular base for engaging into the positioning notches of the fixed bracket to lock the rotary bracket in position when the vertical stub shaft is rotated to 0°, +180° or −180° angle, a spring ring sleeved onto the vertical stub shaft beneath the axle hole of the fixed bracket, and a fastening member fastened to the bottom side of the vertical stub shaft to secure the spring ring in place and to force the spring ring against the positioning plate, the stop plate, the limiter plate and the rotary bracket.

The stop plate further comprises an index block fixedly mounted on the locating block thereof corresponding to a −180° angle indication hole and a 180° angle indication hole on the base member of the folding electronic device for giving an indication when the rotary bracket is rotated to +180° or −180° angle relative to the fixed bracket.

BRIEF DESCRIPTION OF THE DRAWINGS

FIGS. 6A-8A correspond to FIGS. 6-8, showing the positioning of the positioning plate relative to the positioning notches of the fixed bracket.

DETAILED DESCRIPTION OF THE PREFERRED EMBODIMENT

Figure 1:
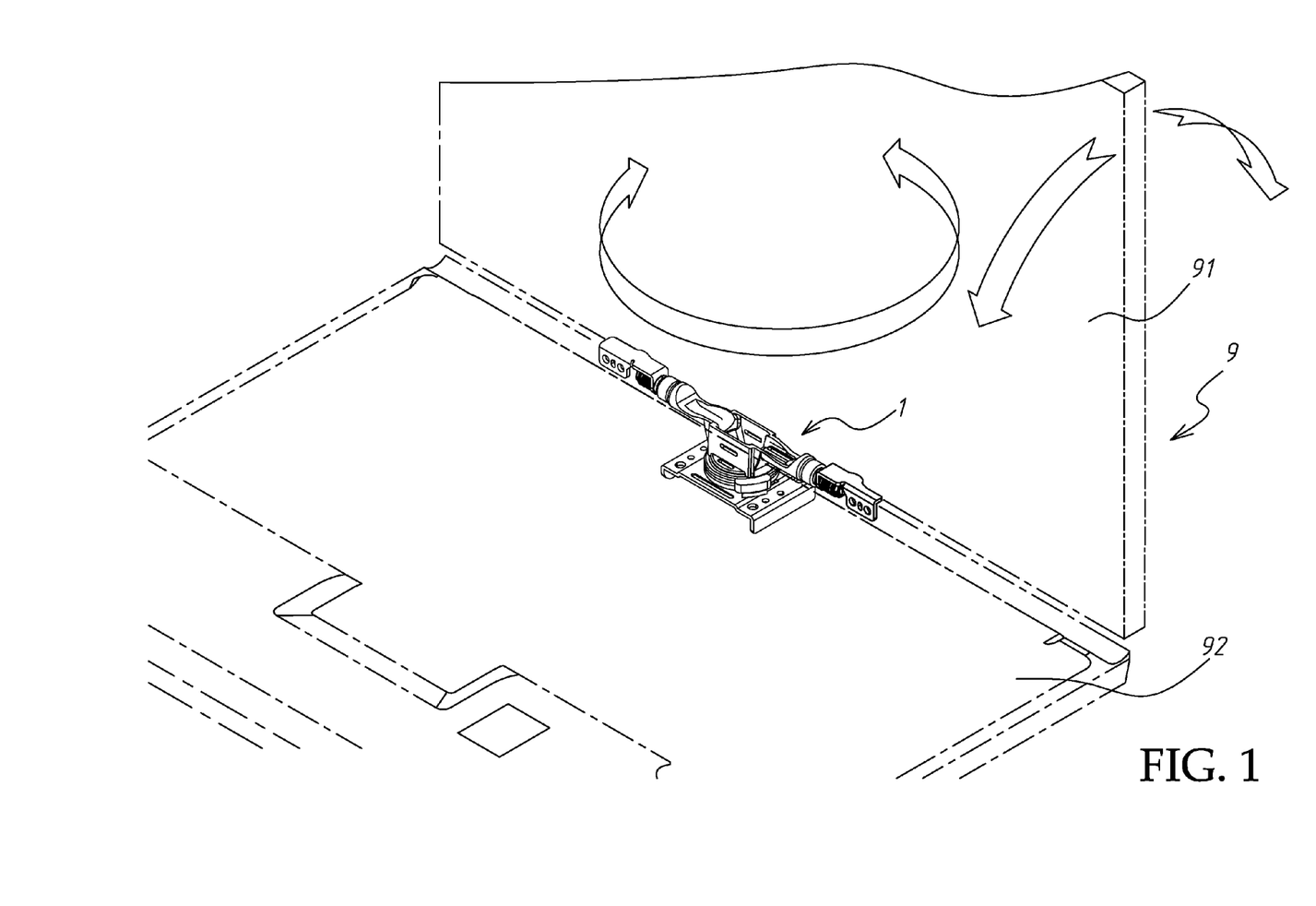
FIG. 1 is schematic drawing, showing a 360° bi-directional rotary hinge used in a folding electronic device in accordance with a first embodiment of the present invention.
Figure 2:
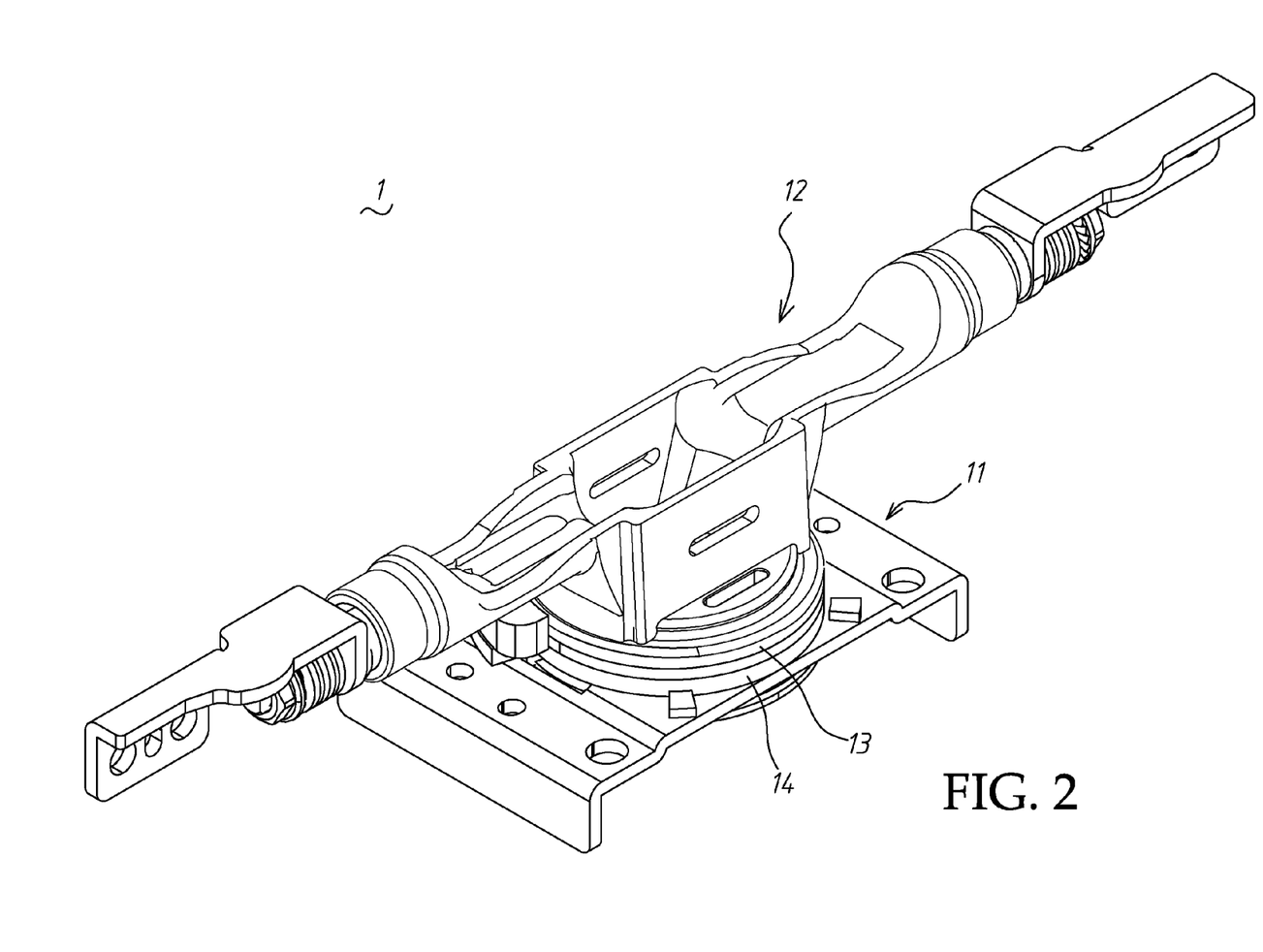
FIG. 2 is an elevational view of the 360° bi-directional rotary hinge in accordance with the first embodiment of the present invention.

Referring to FIG. 1, a 360° bi-directional rotary hinge 1 in accordance with a first embodiment of the present invention is shown used in a folding electronic device, for example, a notebook computer 9 (for example, Thinkpad X201 Tablet launched to the market on Feb. 15, 2010; see http://tinyurl.com/y9j8xs2), and connected between the cover member 91 and base member 92 of the notebook computer 9 such that the cover member 91 can be opened from the base member 92, and rotated through 360° when opened to a vertical position relative to the base member 92, as indicated by the arrowheads in FIG. 1.

Referring to FIGS. 2-5, the 360° bi-directional rotary hinge 1 comprises a fixed bracket 11, a rotary bracket 12, a limiter plate 13, a stop plate 14, a positioning plate 15, a spring ring 16 and a fastening member 17.

Figures 3, 3A:
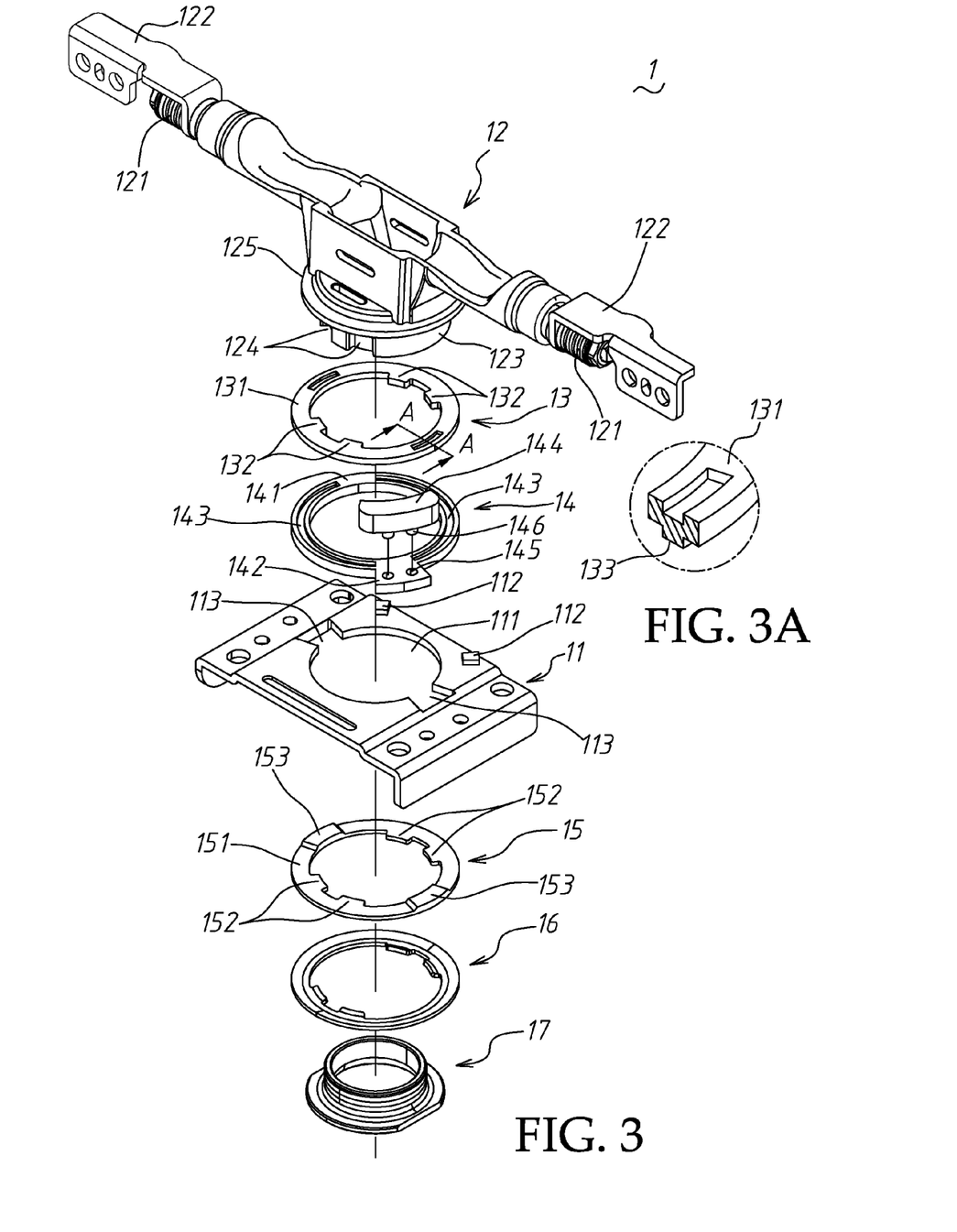
FIG. 3 is an exploded view of the 360° bi-directional rotary hinge in accordance with the first embodiment of the present invention.
FIG. 3A is a sectional view, in an enlarged scale, taken along line A-A of FIG. 3.

The fixed bracket 11 is fixedly mounted in the base member 92 of the notebook computer 9, having an axle hole 111 cut through the top and bottom walls thereof, two stop blocks 112 raised from the top wall and disposed at two opposite sides adjacent to the axle hole 111 and two opposing positioning notches 113 radially extended from the axle hole 111 in reversed directions.

The rotary bracket 12 comprises two pivot arms 121 horizontally aligned in a line at a top side, two mounting plates 122 respectively and rotatably coupled to the pivot arms 121 and affixed to the cover member 91 of the notebook computer 9 for enabling the cover member 91 to be opened from or closed on the base member 92, a stop flange 125 located on the middle at a bottom side, a vertical stub shaft 123 downwardly extended from the stop flange 125 and rotatably inserted through the axle hole 111 of the fixed bracket 11, and a plurality of coupling grooves 124 axially located on the periphery of the vertical stub shaft 123.

The limiter plate 13 comprises an annular base 131, a plurality of locating protrusions 132 radially inwardly extended from the inner wall of the annular base 131 and respectively coupled to the coupling grooves 124 of the rotary bracket 12 for enabling the limiter plate 13 to be rotated with the rotary bracket 12, and two bottom blocks 133 downwardly protruded from the bottom wall of the annular base 131 at two opposite sides (see FIG. 3A).

The stop plate 14 comprises an annular base 141 sleeved onto the vertical stub shaft 123 of the rotary bracket 12 for allowing rotation of the rotary bracket 12 relative to the stop plate 14, a locating block 142 radially extended from the periphery of the annular base 141 and supported on the top wall of the fixed bracket 11 between the two stop blocks 112, and two arched sliding grooves 143 bilaterally located on the top wall of the annular base 141 for receiving the two bottom blocks 133 of the limiter plate 13 respectively.

Figure 5:
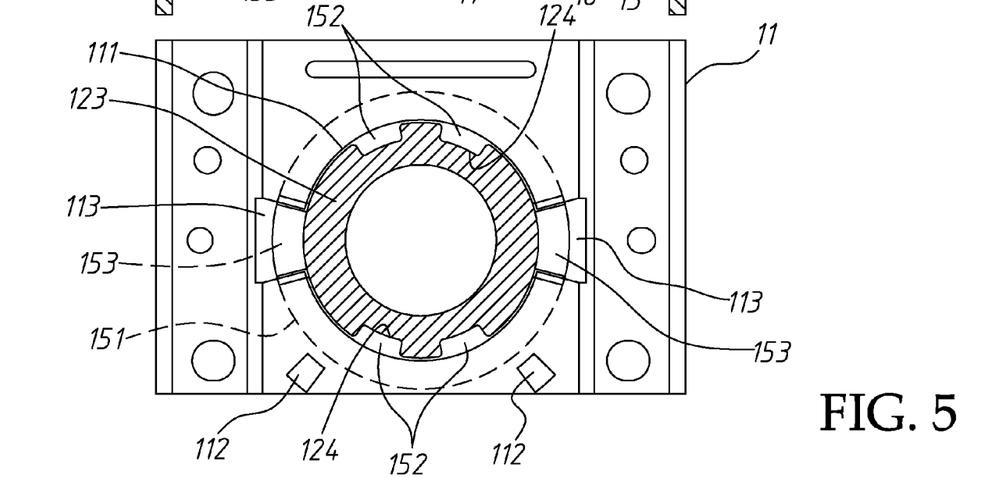
FIG. 5 is a sectional view taken along line A-A of FIG. 4.

The positioning plate 15 is provided beneath the axle hole 111 of the fixed bracket 11, comprising an annular base 151, a plurality of locating protrusions 152 radially inwardly extended from the inner wall of the annular base 151 and respectively coupled to the coupling grooves 124 of the rotary bracket 12 for enabling the positioning plate 15 to be rotated with the rotary bracket 12, and two opposing locating blocks 153 protruded from the top wall for engaging into the positioning notches 113 of the fixed bracket 11 to lock the rotary bracket 12 in position when the vertical stub shaft 123 is rotated to 0°, +180° or −180° angle (see FIG. 5).

The spring ring 16 is sleeved onto the vertical stub shaft 123 beneath the axle hole 111 of the fixed bracket 11.

Figure 4:
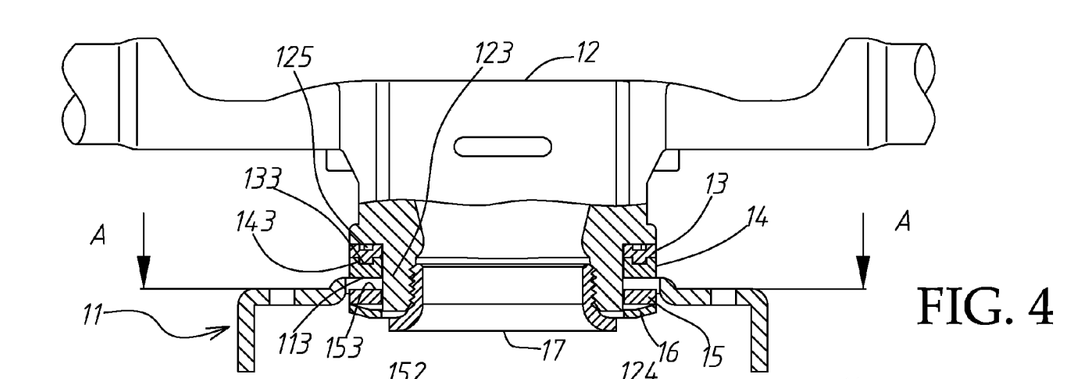
FIG. 4 is a plain and partially sectional view of the 360° bi-directional rotary hinge in accordance with the first embodiment of the present invention.

The fastening member 17 is, for example, a locknut fastened to the bottom side of the vertical stub shaft 123 to secure the spring ring 16 in place, forcing the spring ring 16 against the positioning plate 15, the stop plate 14, the limiter plate 13 and the rotary bracket 12 so that a torque can be produced upon rotation of the rotary bracket 12, as shown in FIG. 4.

Further, as shown in FIG. 3, the two bottom blocks 133 of the limiter plate 13 are downwardly protruded from a middle part of the bottom wall of the annular base 131 between the outer diameter and inner diameter of the annular base 131; the two arched sliding grooves 143 of the stop plate 14 are bilaterally located on the middle part of the top wall of the annular base 141 between the outer diameter and inner diameter of the annular base 141.

Figure 6:
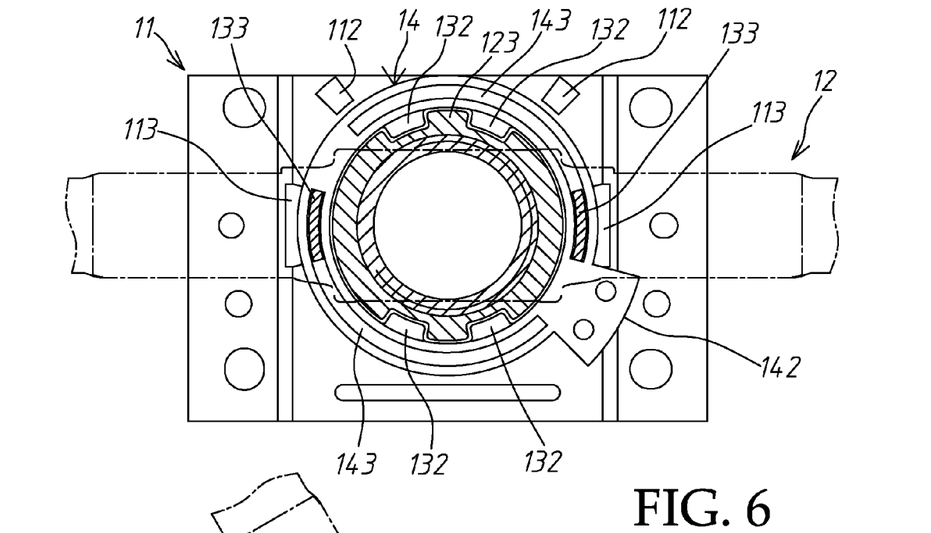
FIGS. 6-8 illustrate a counter-clockwise rotation of the 360° bi-directional rotary hinge in accordance with the first embodiment of the present invention.
Figure 6A:
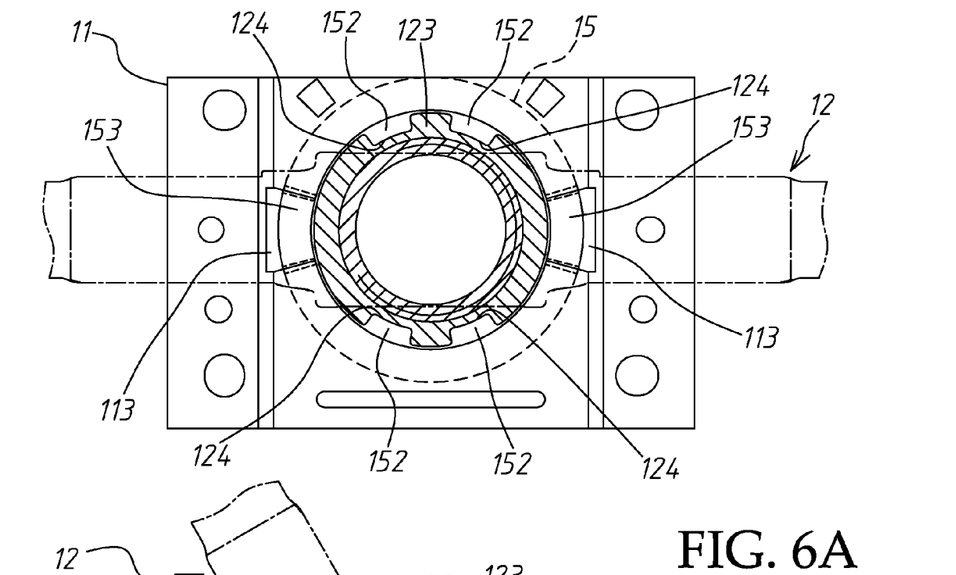
Figure 7:
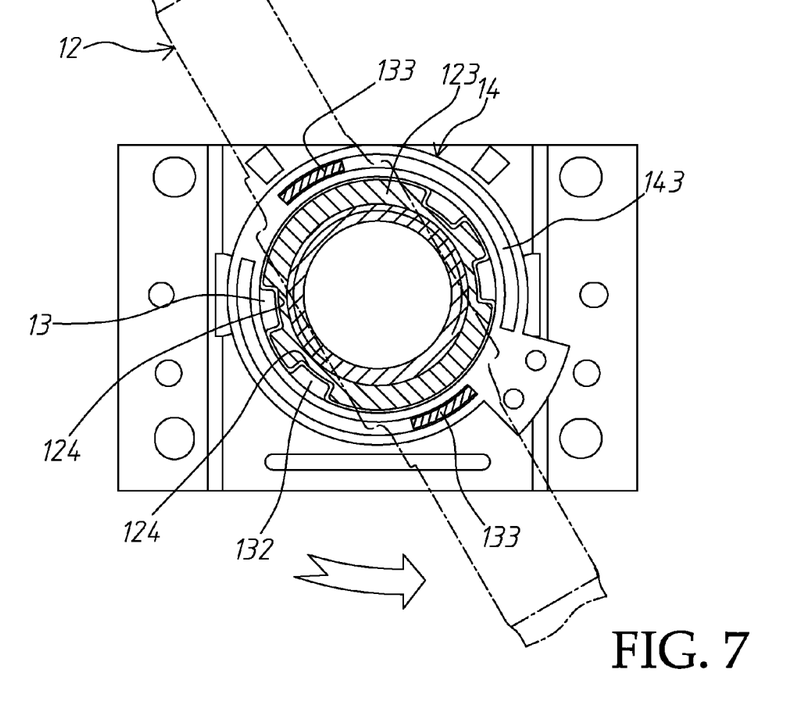
Figure 8:
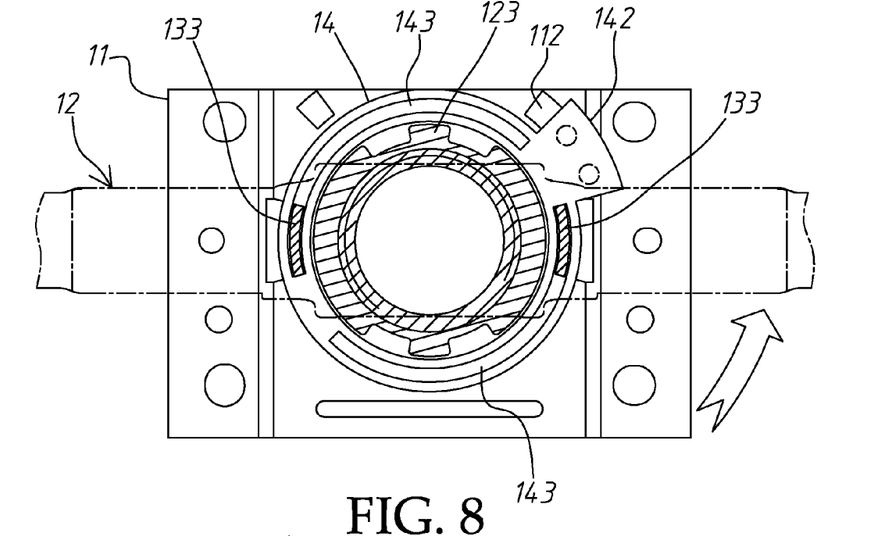

FIGS. 6-8 show a counter-clockwise rotation of the rotary bracket 12. As illustrated, when the vertical stub shaft 123 of the rotary bracket 12 is kept in the 0° angle position (the rotary bracket 12 is kept in horizontal), as shown in FIG. 6, the two bottom blocks 133 of the limiter plate 13 are respectively stopped at one end of each of the two arched sliding grooves 143 of the stop plate 14, and the locating block 142 of the stop plate 14 is kept away from the two stop blocks 112 of the fixed bracket 11, and therefore the rotary bracket 12 is rotatable counter-clockwise. As shown in FIG. 6A, the two opposing locating blocks 153 of the positioning plate 15 are respectively engaged into the positioning notches 113 of the fixed bracket 11 to keep the rotary bracket 12 in the 0° angle position.

Figure 7A:
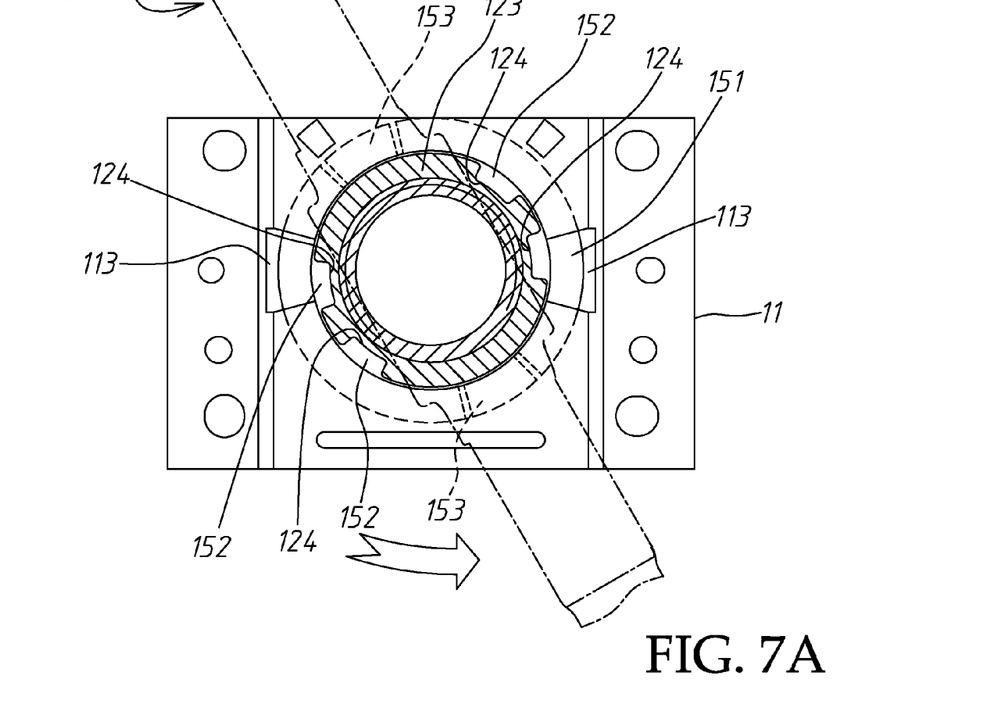

Referring to FIG. 7, when the rotary bracket 12 is rotated counter-clockwise through 120° angle, the limiter plate 13 is synchronously rotated with the rotary bracket 12 subject to engagement between the coupling grooves 124 at the vertical stub shaft 123 of the rotary bracket 12 and the locating protrusions 132 of the limiter plate 13, causing the two bottom blocks 133 of the limiter plate 13 to be respectively moved toward the other end of each of the two arched sliding grooves 143 of the stop plate 14. As shown in FIG. 7A, the coupling grooves 124 at the vertical stub shaft 123 of the rotary bracket 12 are respectively forced into engagement with the locating protrusions 152 of the positioning plate 15 for enabling the positioning plate 15 to be rotated with the rotary bracket 12 to move the two opposing locating blocks 153 away from the positioning notches 113 of the fixed bracket 11, releasing the constraint.

Figure 8A:
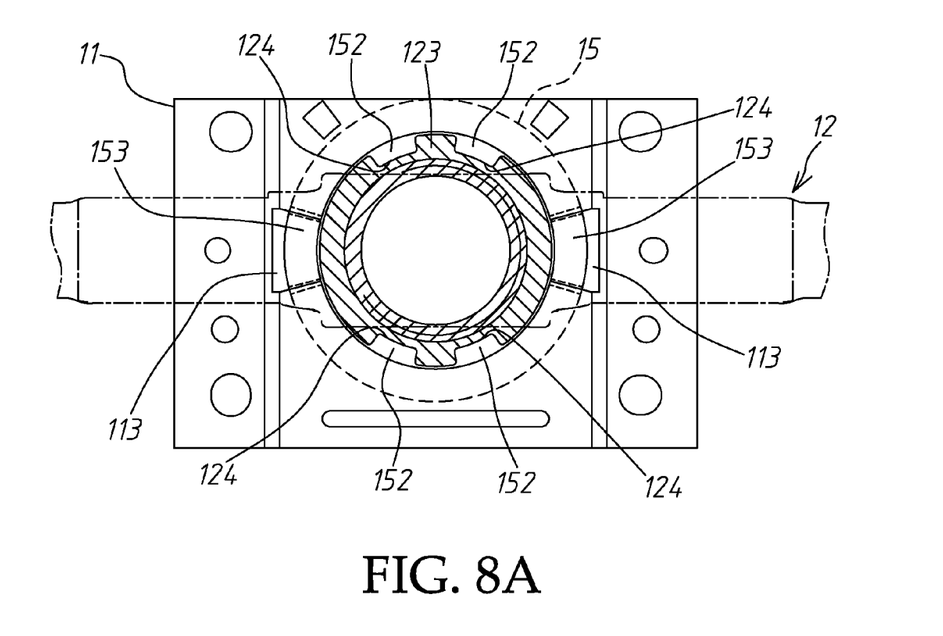

When continuously rotating the rotary bracket 12 in the counter-clockwise direction to 180° angle, as shown in FIG. 8, the limiter plate 13 is rotated with the vertical stub shaft 123 of the rotary bracket 12. At this time, the two bottom blocks 133 of the limiter plate 13 are respectively moved toward the other end of each of the two arched sliding grooves 143 of the stop plate 14 so that the stop plate 14 is rotated with the limiter plate 13 and the rotary bracket 12 to the position where the locating block 142 of the stop plate 14 is stopped against one stop block 112 of the fixed bracket 11 (the right-sided stop block 112 in FIG. 8), and the rotary bracket 12 is stopped from further rotary motion in the counter-clockwise direction. Further, as shown in FIG. 8A, rotation of the vertical stub shaft 123 of the rotary bracket 12 also causes synchronous rotation of the positioning plate 15, forcing the two opposing locating blocks 153 of the positioning plate 15 into the positioning notches 113 of the fixed bracket 11 respectively, thereby locking the rotary bracket 12 in the −180° angle position.

Figure 9:
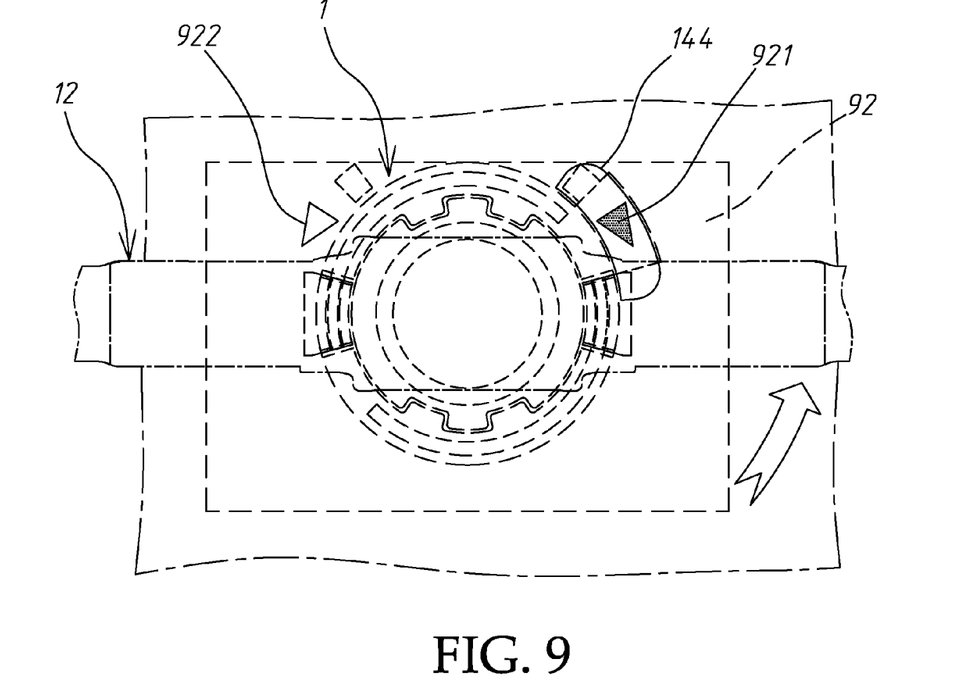
FIG. 9 is a schematic plain view of the 360° bi-directional rotary hinge in the folding electronic device in accordance with the first embodiment of the present invention, showing the angle indication function of the index block during a counter-clockwise rotation.

Referring to FIG. 9, an index block 144 is fixedly mounted on the locating block 142 of the stop plate 14 (see also FIG. 3). The base member 92 of the folding electronic device 9 has a −180° angle indication hole 921. When the rotary bracket 12 is rotated to about the −180° angle position, the index block 144 is moved to the bottom side of the −180° angle indication hole 921 at the base member 92 of the folding electronic device 9, giving an indication that no further counter-clockwise rotation is allowed and a reverse rotation in the clockwise direction can be performed.

Referring to FIG. 3 again, the locating block 142 of the stop plate 14 has two mounting through holes 145 cut through the top and bottom sides; the index block 144 has two bottom pins 146 respectively tightly fitted into the mounting through holes 145 of the locating block 142 of the stop plate 14. Further, the index block 144 is preferably coated with a layer of fluorescent material, giving a striking indication.

Figure 10:
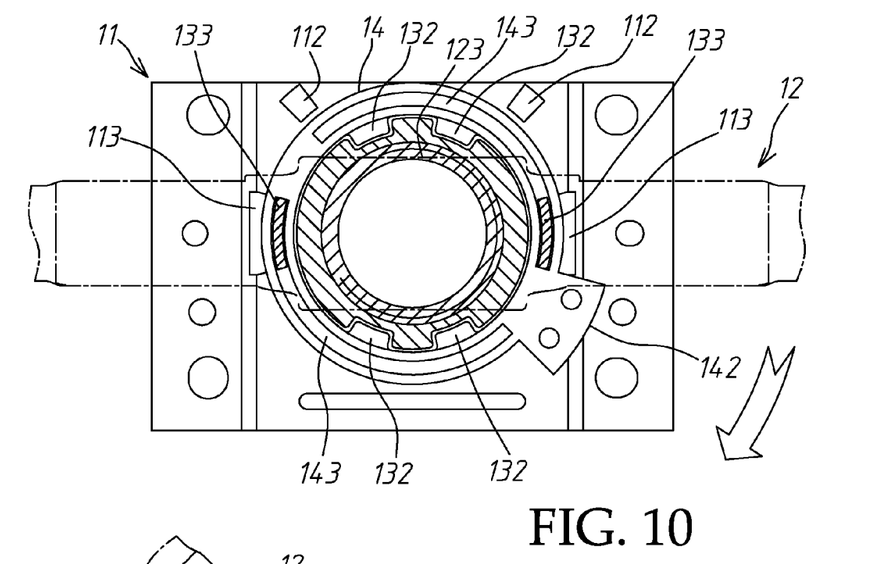
FIGS. 10-12 illustrate a clockwise rotation of the 360° bi-directional rotary hinge in accordance with the first embodiment of the present invention.
Figure 11:
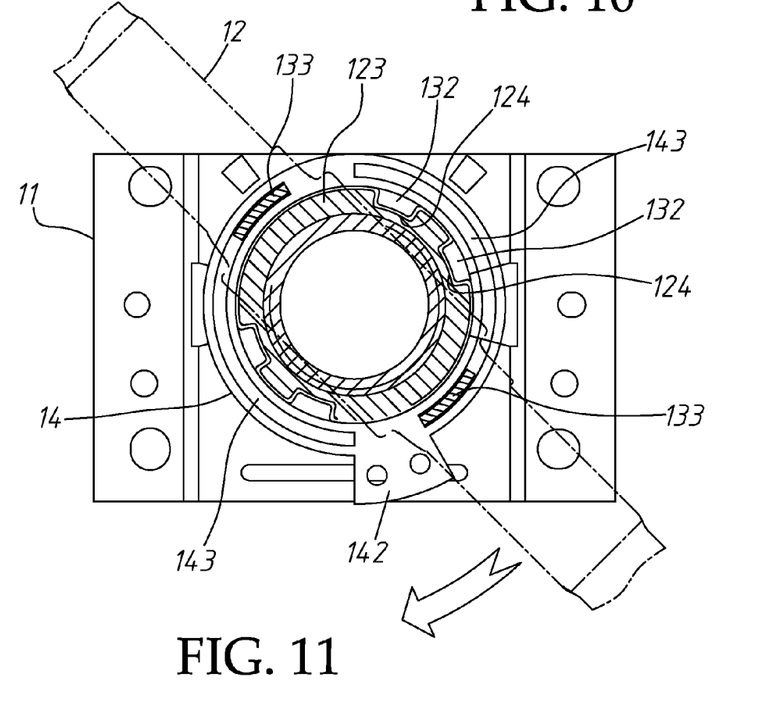
Figure 12:
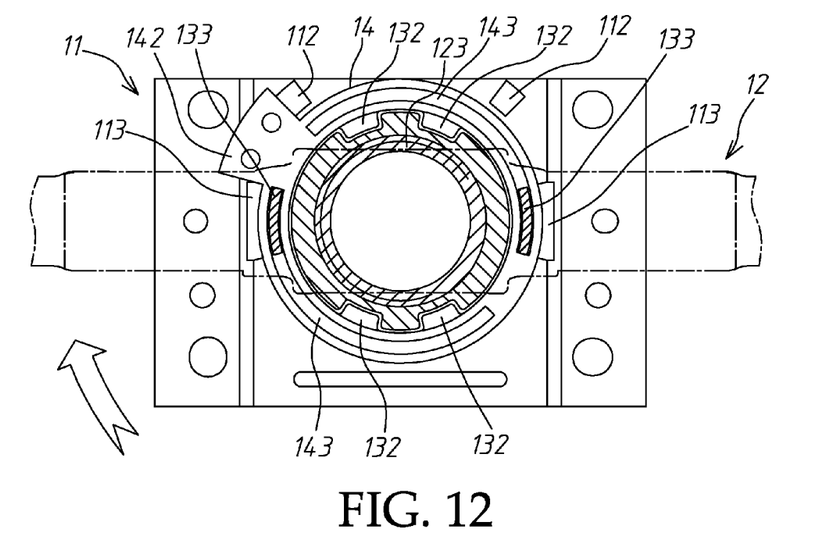

FIGS. 10-12 show a clockwise rotation of the rotary bracket 12. As illustrated, when the vertical stub shaft 123 of the rotary bracket 12 is kept in the 0° angle position (the rotary bracket 12 is kept in horizontal), as shown in FIG. 10 (same as FIG. 6), the two bottom blocks 133 of the limiter plate 13 are respectively stopped at one end of each of the two arched sliding grooves 143 of the stop plate 14, and the locating block 142 of the stop plate 14 is kept away from the two stop blocks 112 of the fixed bracket 11, and therefore the rotary bracket 12 is rotatable clockwise. Same as shown in FIG. 6A, the two opposing locating blocks 153 of the positioning plate 15 are respectively engaged into the positioning notches 113 of the fixed bracket 11 to keep the rotary bracket 12 in the 0° angle position.

Referring to FIG. 11, when the rotary bracket 12 is rotated clockwise through 60° angle, the limiter plate 13 is synchronously rotated with the rotary bracket 12 subject to engagement between the coupling grooves 124 at the vertical stub shaft 123 of the rotary bracket 12 and the locating protrusions 132 of the limiter plate 13, causing the two bottom blocks 133 of the limiter plate 13 to be respectively moved toward the other end of each of the two arched sliding grooves 143 of the stop plate 14. As shown in FIG. 7A, the coupling grooves 124 at the vertical stub shaft 123 of the rotary bracket 12 are respectively forced into engagement with the locating protrusions 152 of the positioning plate 15 for enabling the positioning plate 15 to be rotated with the rotary bracket 12 to move the two opposing locating blocks 153 away from the positioning notches 113 of the fixed bracket 11, releasing the constraint.

When continuously rotating the rotary bracket 12 in the clockwise direction to 180° angle, as shown in FIG. 12, the limiter plate 13 is rotated with the vertical stub shaft 123 of the rotary bracket 12. At this time, the two bottom blocks 133 of the limiter plate 13 are respectively moved toward the other end of each of the two arched sliding grooves 143 of the stop plate 14 so that the stop plate 14 is rotated with the limiter plate 13 and the rotary bracket 12 to the position where the locating block 142 of the stop plate 14 is stopped against one stop block 112 of the fixed bracket 11 (the left-sided stop block 112 in FIG. 12), and the rotary bracket 12 is stopped from further rotary motion in the clockwise direction. Further, as shown in FIG. 8A, rotation of the vertical stub shaft 123 of the rotary bracket 12 also causes synchronous rotation of the positioning plate 15, forcing the two opposing locating blocks 153 of the positioning plate 15 into the positioning notches 113 of the fixed bracket 11 respectively, thereby locking the rotary bracket 12 in the 180° angle position.

Figure 13:
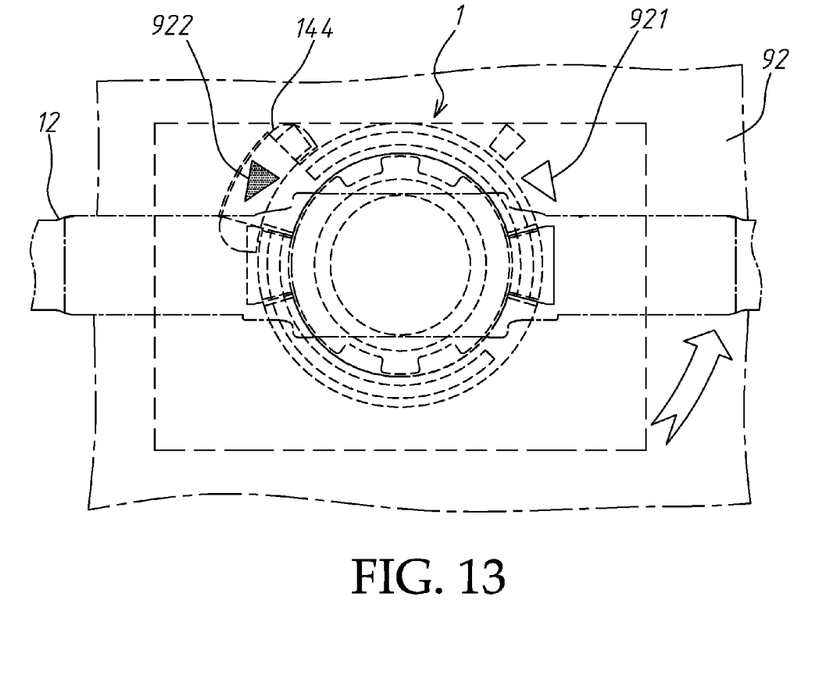
FIG. 13 is a schematic plain view of the 360° bi-directional rotary hinge in the folding electronic device in accordance with the first embodiment of the present invention, showing the angle indication function of the index block during a clockwise rotation.

Referring to FIG. 13, the base member 92 of the folding electronic device 9 has a +180° angle indication hole 922. When the rotary bracket 12 is rotated to about the +180° angle position, the index block 144 is moved to the bottom side of the +180° angle indication hole 921 at the base member 92 of the folding electronic device 9, giving an indication that no further clockwise rotation is allowed and a reverse rotation in the counter-clockwise direction can be performed.

The rotary bracket 12 of the 360° bi-directional rotary hinge 1 is rotatable clockwise and counter-clockwise through +180° and −80° relative to the reference position of 0° angle, i.e., rotation of the rotary bracket 12 of the 360° bi-directional rotary hinge 1 is limited to a forward and backward 360° angle.

Subject to matching between the two bottom blocks 133 of the limiter plate 13 and the two arched sliding grooves 143 of the stop plate 14, movement of the locating block 142 of the stop plate 14 is constrained by the stop blocks 112 of the fixed bracket 11, and therefore rotation of the rotary bracket 12 of the 360° bi-directional rotary hinge 1 is limited to a forward and backward 360° angle. Because the limiter plate 13 and the stop plate 14 are annular members having approximately a same size, the installation of the 360° bi-directional rotary hinge 1 is easy. During operation, the rotary bracket 12 can be rotated relative to the fixed bracket 11 smoothly, avoiding getting stuck.

Figure 14:
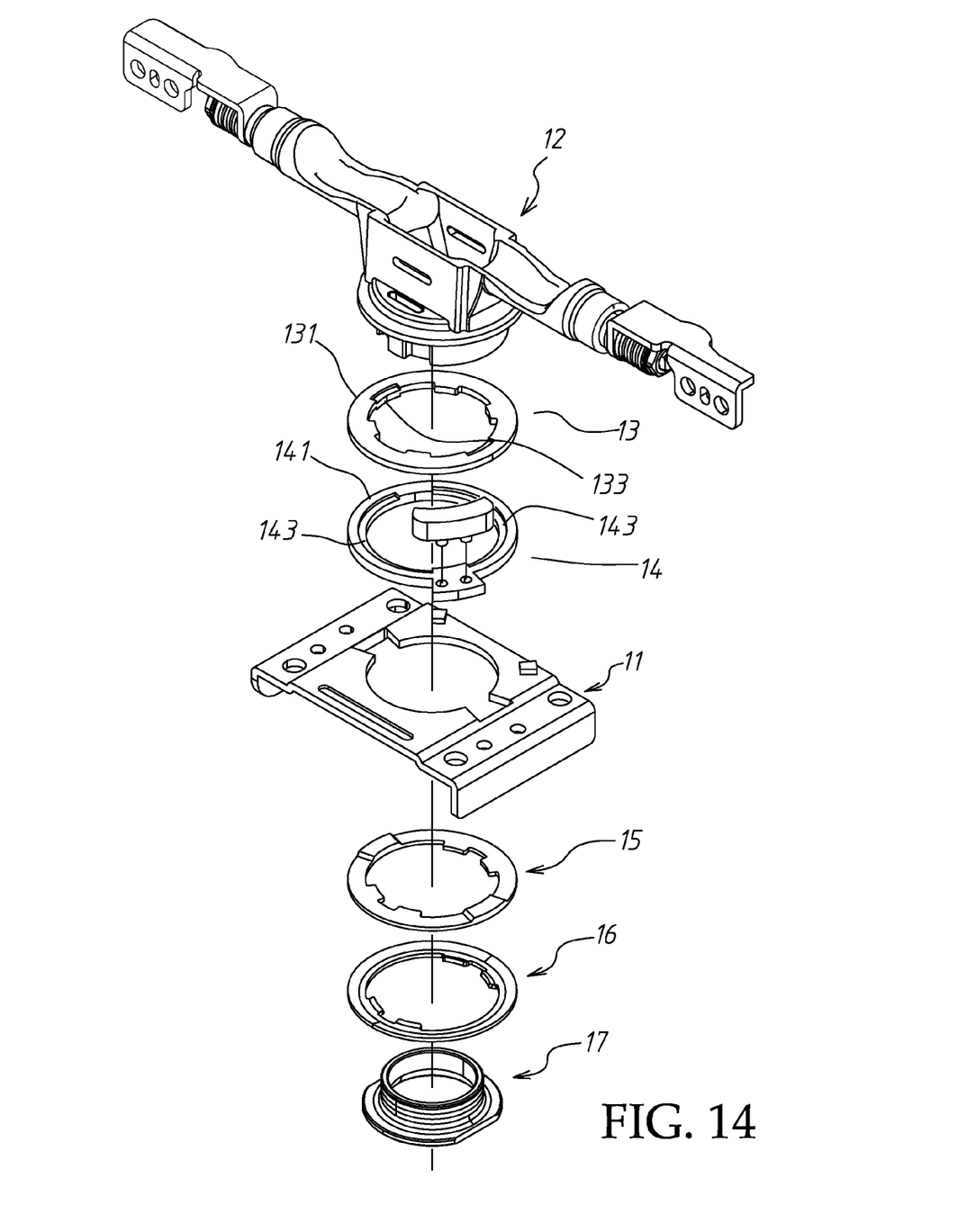
FIG. 14 is an exploded view of a 360° bi-directional rotary hinge in accordance with a second embodiment of the present invention.

FIG. 14 is an exploded view of a 360° bi-directional rotary hinge 1 in accordance with a second embodiment of the present invention. Similar to the aforesaid first embodiment, the 360° bi-directional rotary hinge 1 according to this second embodiment also comprises a fixed bracket 11, a rotary bracket 12, a limiter plate 13, a stop plate 14, a positioning plate 15, a spring ring 16 and a fastening member 17. However, the two bottom blocks 133 of the limiter plate 13 according to this second embodiment are downwardly protruded from the bottom wall of the annular base 131 at two opposite sides along the inner diameter; the two arched sliding grooves 143 of the stop plate 14 according to this second embodiment are bilaterally located on the top wall of the annular base 141 along the inner diameter.

Figure 15:
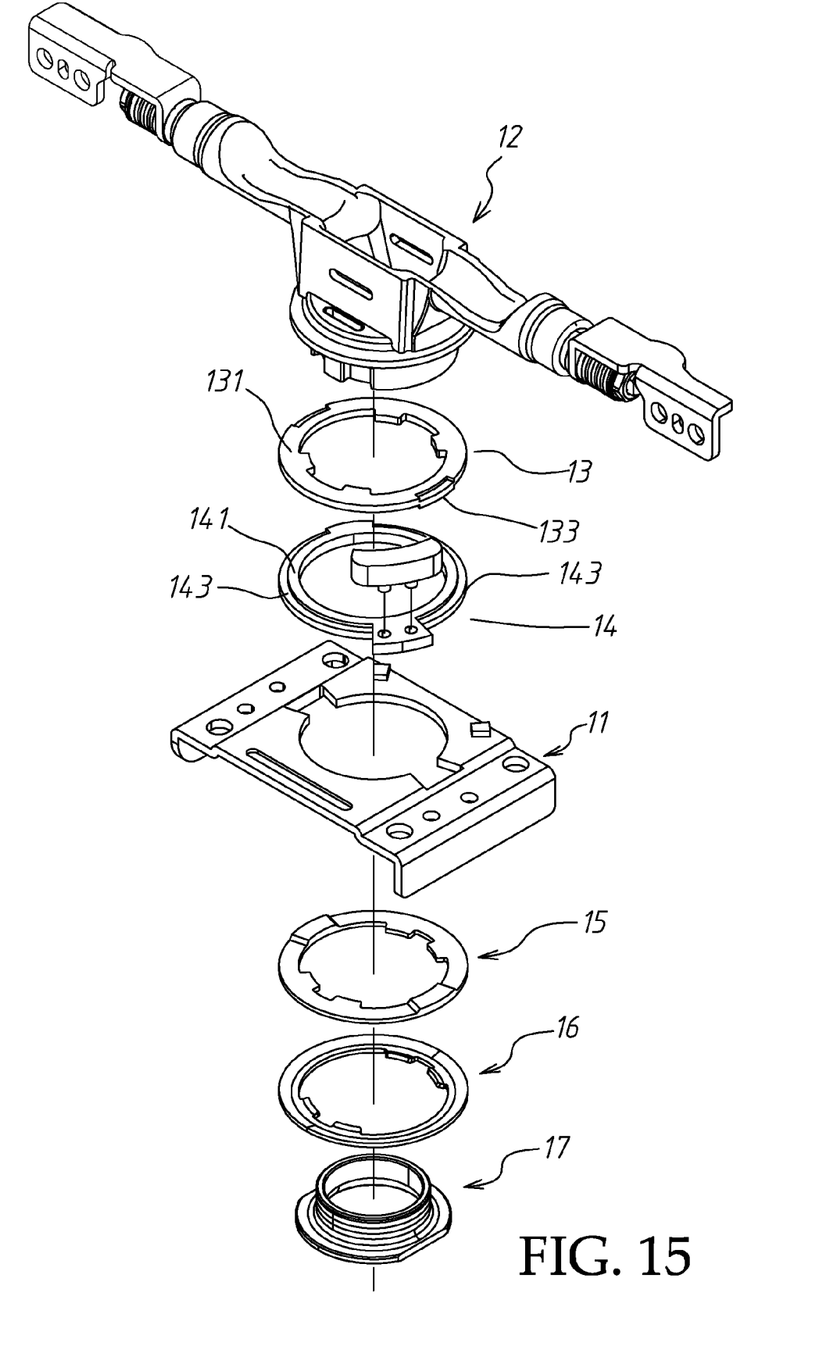
FIG. 15 is an exploded view of a 360° bi-directional rotary hinge in accordance with a third embodiment of the present invention

FIG. 15 is an exploded view of a 360° bi-directional rotary hinge in accordance with a third embodiment of the present invention. This third embodiment is substantially similar to the aforesaid first embodiment with the exception that the two bottom blocks 133 of the limiter plate 13 according to this third embodiment are downwardly protruded from the bottom wall of the annular base 131 at two opposite sides along the outer diameter; the two arched sliding grooves 143 of the stop plate 14 according to this third embodiment are bilaterally located on the top wall of the annular base 141 along the outer diameter.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A 360° bi-directional rotary hinge used in a folding electronic device and connected between a base member and a cover member of said folding electronic device, the 360° bi-directional rotary hinge comprising:

a fixed bracket fixedly mounted in said base member of said folding electronic device, said fixed bracket comprising an axle hole cut through top and bottom walls thereof, two stop blocks raised from the top wall thereof and disposed at two opposite sides adjacent to said axle hole and two opposing positioning notches radially extended from said axle hole in reversed directions;

a rotary bracket, said rotary bracket comprising two pivot arms horizontally aligned in a line at a top side thereof, two mounting plates respectively and rotatably coupled to said pivot arms and affixed to said cover member of said folding electronic device for enabling said cover member to be opened from and closed on said base member, a stop flange located on a middle part thereof, and a vertical stub shaft downwardly extended from said stop flange and rotatably inserted through said axle hole of said fixed bracket;

a limiter plate, said limiter plate comprising an annular base adapted for synchronous rotation with said vertical stub shaft of said rotary bracket, and two bottom blocks downwardly protruded from a bottom wall of the annular base thereof at two opposite sides;

a stop plate, said stop plate comprising an annular base sleeved onto said vertical stub shaft of said rotary bracket for allowing rotation of said rotary bracket relative to said stop plate, a locating block radially extended from the periphery of the annular base thereof and supported on the top wall of said fixed bracket between said two stop blocks, and two arched sliding grooves bilaterally located on the top wall of the annular base thereof for receiving the two bottom blocks of said limiter plate respectively;

a positioning plate provided beneath said axle hole of said fixed bracket, said positioning plate comprising an annular base adapted for rotation with said vertical stub shaft of said rotary bracket and two opposing locating blocks protruded from a top wall of the annular base thereof for engaging into the positioning notches of said fixed bracket to lock said rotary bracket in position when said vertical stub shaft is rotated to one of the positions of 0°, +180° and −180° angle;

a spring ring sleeved onto said vertical stub shaft beneath the axle hole of said fixed bracket; and a fastening member fastened to a bottom side of said vertical stub shaft to secure said spring ring in place and to force said spring ring against said positioning plate, said stop plate, said limiter plate and said rotary bracket.

2. The 360° bi-directional rotary hinge as claimed in claim 1, wherein said rotary bracket further comprises a plurality of coupling grooves axially located on the periphery of said vertical stub shaft; said limiter plate comprises a plurality of locating protrusions radially inwardly extended from an inner wall of the annular base thereof and respectively coupled to the coupling grooves of said rotary bracket.

3. The 360° bi-directional rotary hinge as claimed in claim 1, wherein the two bottom blocks of said limiter plate are downwardly protruded from a middle part of the bottom wall of the annular base of said limiter plate between outer diameter and inner diameter of said limiter plate; the two arched sliding grooves of said stop plate are bilaterally located on a middle part of the top wall of the annular base of said stop plate between outer diameter and inner diameter of said stop plate.

4. The 360° bi-directional rotary hinge as claimed in claim 1, wherein said stop plate further comprises an index block fixedly mounted on the locating block thereof corresponding to a −180° angle indication hole and a 180° angle indication hole on said base member of said folding electronic device for giving an indication when said rotary bracket is rotated to one of the positions of +180° and −180° angle relative to said fixed bracket.

5. The 360° bi-directional rotary hinge as claimed in claim 4, wherein said locating block of said stop plate comprises two mounting through holes cut through top and bottom sides thereof;

said index block comprises two bottom pins respectively tightly fitted into the mounting through holes of said locating block of said stop plate.

6. The 360° bi-directional rotary hinge as claimed in claim 4, wherein said index block is coated with a layer of fluorescent material.

7. The 360° bi-directional rotary hinge as claimed in claim 1, wherein the two bottom blocks of said limiter plate are downwardly protruded from the bottom wall of the annular base of said limiter plate along an inner diameter of said limiter plate; the two arched sliding grooves of said stop plate are bilaterally located on the top wall of the annular base of said stop plate along an inner diameter of said stop plate.

8. The 360° bi-directional rotary hinge as claimed in claim 1, wherein the two bottom blocks of said limiter plate are downwardly protruded from the bottom wall of the annular base of said limiter plate along an outer diameter of said limiter plate; the two arched sliding grooves of said stop plate are bilaterally located on the top wall of the annular base of said stop plate along an outer diameter of said stop plate.

* * * * *